United States Patent
Kumarasamy et al.

(10) Patent No.: US 8,571,198 B2
(45) Date of Patent: Oct. 29, 2013

(54) HANDLING REDIRECT CALLS

(75) Inventors: Parameswaran Kumarasamy, San Jose, CA (US); Sandeep Singh Kohli, Fremont, CA (US); Kavithadevi Parameswaran, San Jose, CA (US); Vinay Pande, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1910 days.

(21) Appl. No.: 11/545,744

(22) Filed: Oct. 10, 2006

(65) Prior Publication Data
US 2008/0084986 A1 Apr. 10, 2008

(51) Int. Cl.
*H04M 3/42* (2006.01)
*H04M 7/00* (2006.01)

(52) U.S. Cl.
USPC .................... 379/211.02; 379/221.01

(58) Field of Classification Search
USPC ............. 370/401, 352, 353, 354, 355, 356; 379/265.02, 211.02, 201.07, 201.08, 379/201.1, 201.11, 221, 233, 355, 211.03, 379/212.01, 221.01, 221.08, 221.1, 211.11, 379/221.09, 221.12; 455/417, 445, 456, 455/459, 461
See application file for complete search history.

(56) References Cited

U.S. PATENT DOCUMENTS

| | | | | |
|---|---|---|---|---|
| 6,996,076 B1* | 2/2006 | Forbes et al. | ................. | 370/310 |
| 7,653,191 B1* | 1/2010 | Glasser et al. | ............. | 379/201.1 |
| 2001/0005372 A1* | 6/2001 | Cave et al. | .................... | 370/401 |
| 2002/0114282 A1* | 8/2002 | MeLampy et al. | ............ | 370/238 |
| 2002/0136206 A1* | 9/2002 | Gallant et al. | ................ | 370/352 |
| 2002/0159439 A1* | 10/2002 | Marsh et al. | .................. | 370/352 |
| 2002/0187777 A1* | 12/2002 | Osterhout et al. | ............ | 455/417 |
| 2004/0174979 A1* | 9/2004 | Hutton et al. | ............ | 379/265.02 |
| 2005/0074031 A1* | 4/2005 | Sunstrum | ...................... | 370/493 |
| 2005/0083912 A1* | 4/2005 | Afshar et al. | ................. | 370/352 |
| 2005/0091407 A1* | 4/2005 | Vaziri et al. | ................... | 709/246 |
| 2005/0094623 A1* | 5/2005 | D'Eletto | ....................... | 370/352 |
| 2005/0207432 A1* | 9/2005 | Velez-Rivera et al. | ........ | 370/401 |
| 2005/0286496 A1* | 12/2005 | Malhotra et al. | ............. | 370/352 |
| 2006/0209791 A1* | 9/2006 | Khadri et al. | ................. | 370/352 |
| 2006/0209794 A1* | 9/2006 | Bae et al. | ...................... | 370/352 |
| 2007/0060137 A1* | 3/2007 | Yeatts et al. | .................. | 455/445 |
| 2007/0092073 A1* | 4/2007 | Olshansky et al. | ........... | 379/232 |
| 2007/0248077 A1* | 10/2007 | Mahle et al. | .................. | 370/352 |
| 2009/0073965 A1* | 3/2009 | Dowling et al. | ............. | 370/352 |
| 2009/0214007 A1* | 8/2009 | Van Wyk et al. | ........... | 379/88.19 |

OTHER PUBLICATIONS

Mahy, R., et al. "The Session Initiation Protocol (SIP) "Replaces" Header" Network Working Group, Sep. 2004; http://www.ietf.org/rfc/rfc3891.txt.

* cited by examiner

*Primary Examiner* — Mohammad Islam
*Assistant Examiner* — Kharye Pope
(74) *Attorney, Agent, or Firm* — Fish & Richardson P.C.

(57) ABSTRACT

In a particular embodiment, a network device receives, from a first device, a first call request for a second device. The network device may then send the first call request to a redirect server, which can determine where to send the call. The network device receives a response from the redirect server indicating an address to redirect the call request to. The network device then determines a redirect ID for the redirect. The network device sends a message to the first device with the redirect ID where the message indicates that a redirection occurred to the third device. The network device then receives a second call request from the first device that includes the redirect ID. The network device determines if the call was part of a previous redirect. If so, the second call request is sent to the address associated with the redirect ID.

18 Claims, 5 Drawing Sheets

HANDLING REDIRECT CALLS

TECHNICAL FIELD

The present disclosure relates generally to networking.

BACKGROUND

In Voice over Internet Protocol (VoIP) networks, interworking various supplementary services may be necessary. For example, one service is a redirect, which is commonly used in VoIP networks including session initiation protocol (SIP) and H.323 networks. Typically, a session border controller (SBC) may receive a call request from a first end device for a second end device. A redirect server is used to keep track of addresses for various end devices. The call request is sent to the redirect server, which can then determine the correct address for the end device. In cases where a call is redirected, the redirect service sends back a redirect message with a third end device's address. One of the main functions of an SBC is to provide address hiding. Address hiding is where each side of the communication does not know the other side's address. Thus, the SBC keeps track of each end device's address. When the SBC sends communications to end devices, the SBC's address is included as a respond-to address instead of the other end device's address.

When the SBC gets a redirect to the third end device, the SBC may not just redirect the call request to the third end device. Rather, the SBC may have to send a message back to the first end device such that the first end device can decide whether it wants to initiate a call to the third end device. Reasons that the first end device may not want the call directly redirected may be because the redirection may be to an international call or may be a long-distance call where the first call to the second device was a local call. When the SBC sends the message back to the first device, the SBC includes its own address as a respond-to address. The message also indicates that a redirect to a third end device is requested. If the first end device wants to initiate a call to the third end device, then an invite for the third end device is sent to the SBC. This is treated as a new invite and it is sent to the redirect server again. The redirect server then responds with another redirect message. Since this is another redirect, the SBC will send another message back to the first end device. This causes an infinite loop that does not redirect the call to the third end device.

Further, if the third end device's address is included in the message back to the first end device, this would break the address hiding, which is one of the main functionalities of the SBC. This may cause security issues in that the first end device may end up establishing a call directly to the third end device and bypassing the SBC. This may cause potential revenue loss and also may cause security issues in bypassing the SBC. Further, the call may fail because the first end device is not configured to make direct connections.

SUMMARY

Particular embodiments generally relate to processing redirects at a network device. A network device receives, from a first device, a first call request for a second device. The network device may then send the first call request to a redirect server, which can determine where to send the call. The network device receives a response from the redirect server indicating an address to send the call request to. For example, the redirect server may send a response indicating the call request should be redirected from the second device to a third device.

The network device then determines a redirect ID for the redirect. The redirect ID is different from an address, such as an IP address, that is used to communicate with the third device. The redirect ID is then stored along with the address for the third device. The network device sends a message to the first device with the redirect ID where the message indicates that a redirection occurred to the third device. The message does not include the address of third device. Rather, the network device preserves address hiding by including the network device's address as a respond-to address in the message, along with third device's number, the redirected called number.

The network device then receives a second call request from the first device that includes the redirect ID. The second call request is sent to the network device's address as it was included in the message as the respond-to address. The network device determines if the call was part of a previous redirect. For example, the network device determines if the redirect ID has been stored. If so, the second call request is sent to the address associated with the redirect ID (i.e., the address for the third device). The second call request is then sent to the third device without sending the second call request to the redirect server.

A further understanding of the nature and the advantages of particular embodiments disclosed herein may be realized by reference of the remaining portions of the specification and the attached drawings.

DESCRIPTION OF EXAMPLE EMBODIMENTS

Figure 1:
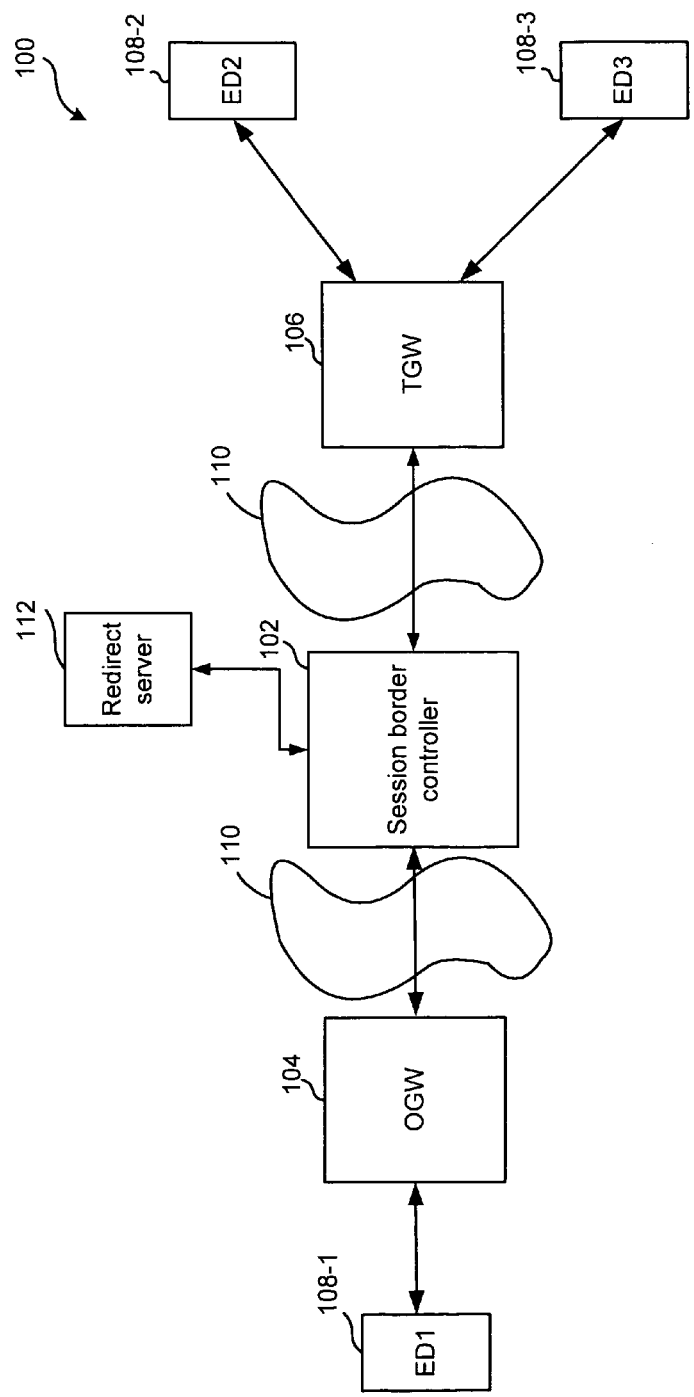
FIG. 1 illustrates an example system for redirecting calls.

FIG. 1 illustrates an example system for redirecting calls. As shown, a session border controller (SBC) 102, an originating gateway (OGW) 104, a terminating gateway (TGW) 106, end devices 108, network 110, and a redirect server 112 are provided.

Redirect server 112 is configured to handle redirects. In a particular embodiment, redirect server 112 keeps track of addresses for end devices 108. For example, end devices 108 may move around and be connected to different ports. When this happens, addresses for end devices 108 may change. For example, an IP address for end devices 108 may change depending on where (e.g., which port) they are connected. Redirect server 112 is used to keep track of the addresses that can be used to contact end devices 108.

End devices 108 may be any devices (e.g., end points) that can participate in a communication. For example, end devices may be IP telephones, public switch telephone network (PSTN) devices, computers, instant message clients, soft phones, or any other devices that can participate in a communication.

Originating gateway 104 may be any network device configured to manage communications with end device 108-1. In a particular embodiment, gateway 104 manages a set of end devices 108 (the plurality of end devices 108 not shown). Originating gateway 104 may be the gateway that originates a communication.

Terminating gateway 106 may be any network device configured to manage communications with end devices 108-2 and 108-3. Terminating gateway 106 may be the gateway that receives a communication from originating gateway 104. Terminating gateway 106 may then send a communication to an end device 108-2 or 108-3. Although one terminating gateway 106 is shown, it will be understood that other gateways may be included. Although originating gateway 104 and terminating gateway 106 are referred to as "originating" and "terminating", it will be understood that communications may be flow in both directions. Thus, originating gateway 104 and terminating gateway 106 may originate and terminate communications.

Session border controller 102 is a network device configured to sit in between communications between originating gateway 104 and terminating gateway 106. Session border controller 102 may include IP-to-IP gateways, SIP proxies, Back-To-Back User Agents (B2BUAs), etc.

Network 110 may be any network. For example, network 110 may be an IP network. Session initiation protocol (SIP) may be used to send SIP messages between originating gateway 104 and terminating gateway 106. Although SIP is described, it will be understood that other protocols may be appreciated.

To initiate a call, end device 108-1 sends a call request for end device 108-2. The call request is sent through originating gateway 104 to session border controller 102. Session border controller 102 then sends the call request to redirect server 112.

Redirect server 112 can then determine how the call request should be routed. For example, if the call should be redirected, redirect server 112 may send a redirect message back to session border controller 102 indicating the call should be redirected to end device 108-3. The redirect message may include an address for contacting end device 108-3. Also, if there is not a redirection, redirect server 112 returns the address for end device 108-2. Redirect server 112 is always contacted in a particular embodiment because it keeps track of addresses for end devices 108. This is because end devices 108 may change addresses, such as when they are attached to different ports. Instead of changing entries in session border controller 102, redirect server 112 keeps track of the addresses. This may lessen the load on session border controller 102, which may need processing power for other functions.

In a particular embodiment, session border controller 102 is configured to provide address hiding. Address hiding is where end device 108-1 does not know the address to contact end device 108-2 or end device 108-3 during a call. Rather, session border controller 102 provides its own address as the respond-to address in messages sent to either end device 108-1, 108-2, or 108-3. Thus, end devices 108 think they are participating in a call with session border controller 102, but, in reality, session border controller 102 is facilitating a call between end device 108-1 and end device 108-2 or 108-3.

When a redirect message is received from redirect server 112, session border controller 102 is configured to facilitate the redirection. In a particular embodiment, session border controller 102 determines a redirect ID for the third device. The redirect ID is different from the address used to communicate with the third device and may be unique to this redirection. For example, the redirect ID can be used to determine that a subsequent call request is for this redirection. The redirect ID and address are stored for later use if a second call request from end device 108-1 is received. For example, if end device 108-1 decides initiate a call to end device 108-3 based on the redirect.

Session border controller 102 then sends a message to end device 108-1 indicating that a redirect occurred to end-device 108-3. The message sent uses the address for session border controller 102 as a respond-to address and also includes the redirect ID. End device 108-1 can then determine if it wants to initiate a call request to end device 108-3. If so, end device 108-1 sends a call request with the redirect ID and the address for session border controller 102.

The call request sent to session border controller 102 includes the redirect ID, which session border controller 102 uses to determine that the message should or should not be sent to redirect server 112. In one example, if a redirect ID has been stored, then the address associated with the redirect ID is retrieved and a call request is sent to address (end device 108-3) instead of sending the call request to redirect server 112.

Accordingly, SBC 102 does not send a subsequent call request to redirect server 112 when the second call request is received for a redirection. In a particular embodiment, session border controller 102 may be configured to send all call requests to redirect server 112 except for when the previous redirect is determined. This is because redirect server 112 keeps track of addresses for end devices 108. In one example, if a redirect is not specified to another device, redirect server 112 sends the address for the same end device 108 that is requested. For example, if end device 108-1 sends a call request for end device 108-2, and end device 108-2 has not redirected the call, redirect server 112 sends a redirect message with the address for end device 108-2. Thus, even if the call request is not redirected, a redirect message is sent back to session border controller 102.

If there is no redirect to another end device 108 (which means 302 from redirect server will have the originally requested end device 108-2 contact info), SBC 102 sends an INVITE to end device 108-2. Accordingly, SBC 102 does not forward the 302 message back to end device 108-1.

Figure 2:
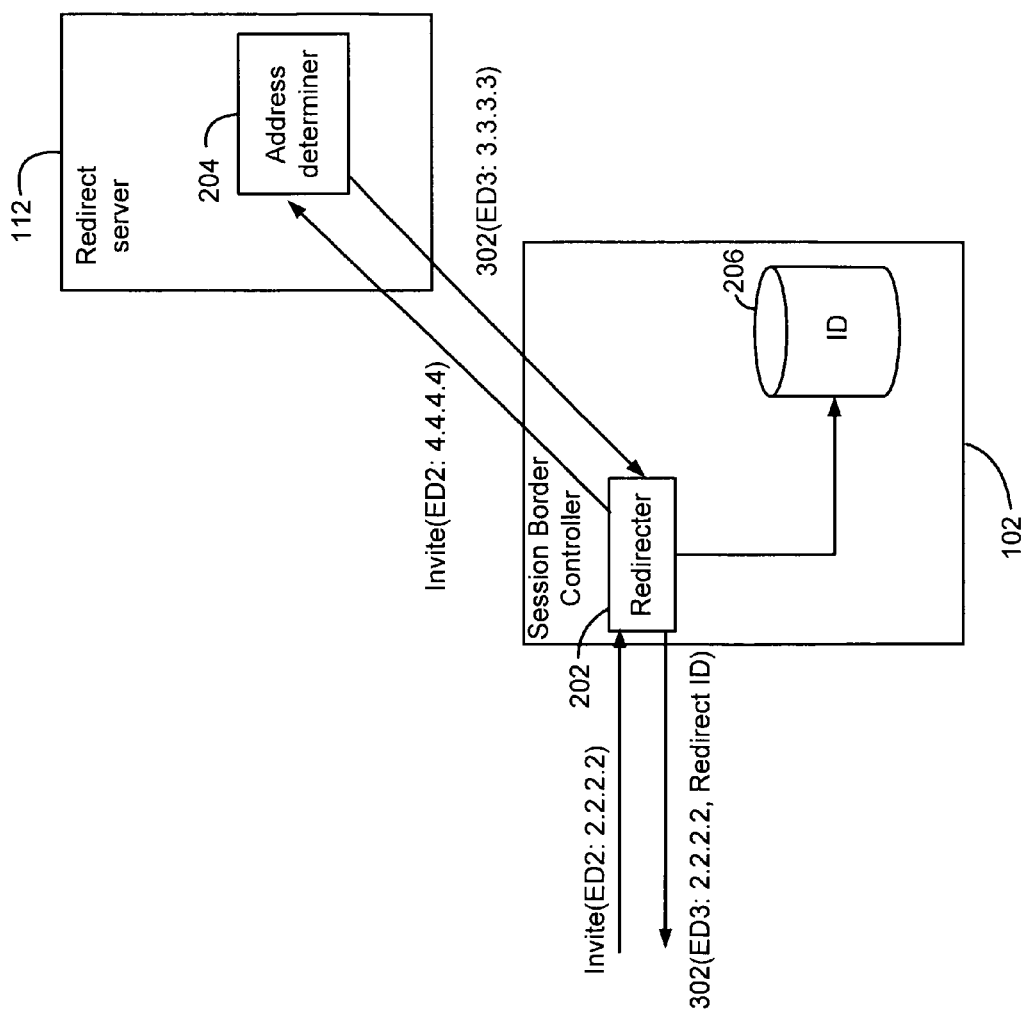
FIG. 2 illustrates an example SBC and an example redirect server.

FIG. 2 illustrates an example SBC and an example redirect server. As shown, session border controller 102 includes a redirecter 202 and storage 206. Redirect server 112 includes an address determiner 204.

End device 108-1 may send an invite for end device 108-2 (ED2). ED2 is a contact identifier for end device 108-2. For example, the contact identifier may be a called number (e.g., a telephone number—415 555 5555). The invite message is a call request to initiate a call to end device 108-2. Redirecter 202 receives the invite and is configured to forward the invite to redirect server 112.

Address determiner 204 is then configured to determine an address to send the call to. For example, address determiner 204 may determine that end device 108-2 wants to redirect calls to end device 108-3. If end device 108-2 does not want to redirect calls, then an address for end device 108-2 may be sent. It is assumed, in this case, that end device 108-2 wants to redirect the request to end device 108-3. As shown, a 302 (ED3: 3:3.3.3) message is sent to redirecter 202. The address of 3.3.3.3 is an address that can be used to contact end device 108-3. Also, the contact identifier of ED3 identifies end device 108-3.

Redirecter 202 is then configured to store the address for end device 108-3 in storage 206. Redirecter 202 also determines a redirect ID with the address. In a particular embodiment, the redirect ID is determined from information in the redirect message from redirect server 112. For example, any information that uniquely identifies this call redirect may be used. Information in the replaces header, such as a Call-ID, to-tag, and from-tag, may be determined and stored. Information from the replaces header may uniquely identify the session. The call-ID may be created for the session and the to-tag and from-tag may identify end device 108-1 (from) and end device 108-3 (to). In another particular embodiment, the redirect ID may be generated by redirector 202. For example, the redirect ID may be derived from information in the redirect message or may be a unique number that is specific to this redirect message. The redirect ID is made specific to this redirect because other calls to the end device 108-3 that are not for this redirect should go through redirect server 112 as the usual process is instead of being forwarded to end device 108-3 without going through redirect server 112.

Redirecter 202 then sends a 302 (ED3: 2.2.2.2, Redirect ID) message. The 302 message includes the redirect ID and the address for session border controller 102 as a respond-to address.

Figure 3:
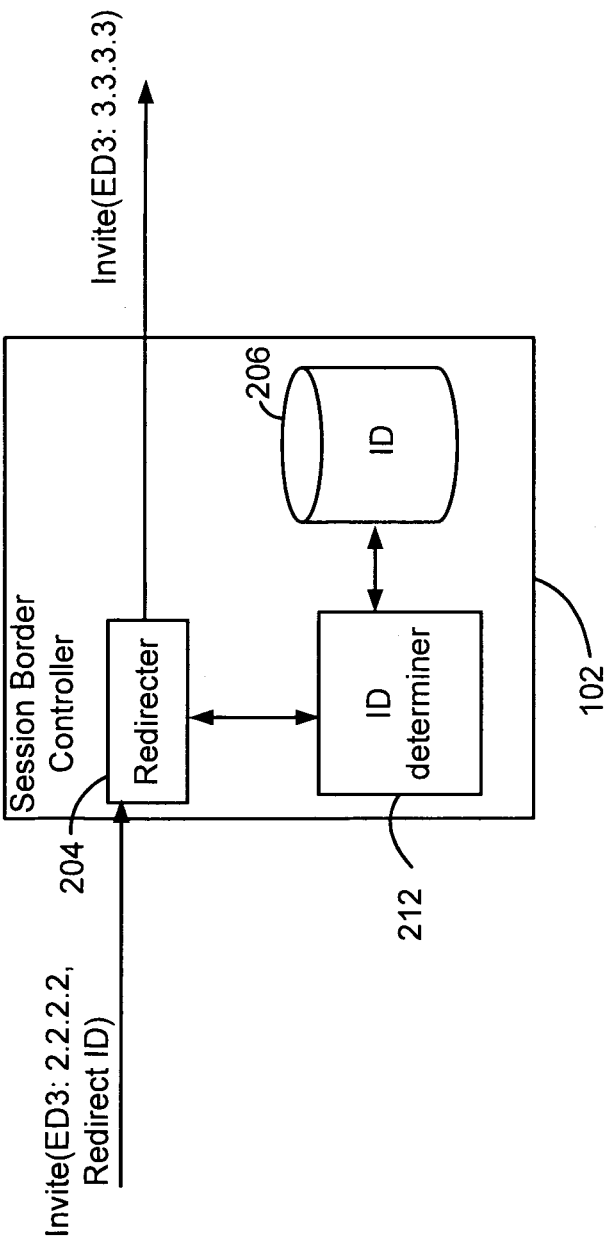
FIG. 3 illustrates another example SBC.

When end device 108-1 receives the 302 message, it can decide whether or not it wants to initiate a call to end device 108-3. If it does, as shown in FIG. 3, end device 108-1 sends another invite message to session border controller 102, such as an invite (Offer: ED3, 2.2.2.2, Redirect ID). The invite message is sent to the address (e.g., 2.2.2.2) for session border controller 102 because that address was included in the respond-to address. Also, the Redirect ID is included in the message as an offer to set up a call with end device 108-3.

Redirecter 202 receives the invite message and sends it to an ID determiner 302. ID determiner 302 is configured to determine if the call has previously been redirected. For example, if the redirect ID has been stored in storage 206, then session border controller 102 does not send the invite to redirector 112. If it is not stored in storage 206, then the invite is sent to redirector 112 as it is usually.

In this case, the redirect ID has been stored in storage 206 and ID determiner 302 determines the address associated with the redirect ID. ID determiner 302 sends the address to redirecter 202, which can then send an invite message using the address associated with the redirect ID. For example, an invite (Offer: ED3: 3.3.3.3) message is sent to the address 3.3.3.3. This sends the invite message to end device 108-3.

Accordingly, because the redirect ID was in storage 206, session border controller 102 knows that a previous redirect was received from redirect server 112. Session border controller 102 does not contact redirect server 112 again to determine an address for the invite request. Rather, redirect server 112 is bypassed. Thus, any unnecessary call loops are avoided.

In a particular embodiment, the entry in storage 206 is deleted after the second call request is received. This is because subsequent call requests not for this redirect should be sent to redirect server 112 because they would not be for this specific redirect. This preserves the functionality of including a redirect server in system 100. Also, the entry in storage 206 may be deleted for other reasons, such as after a period of time, per request of end device 108-1, etc.

Figure 4:
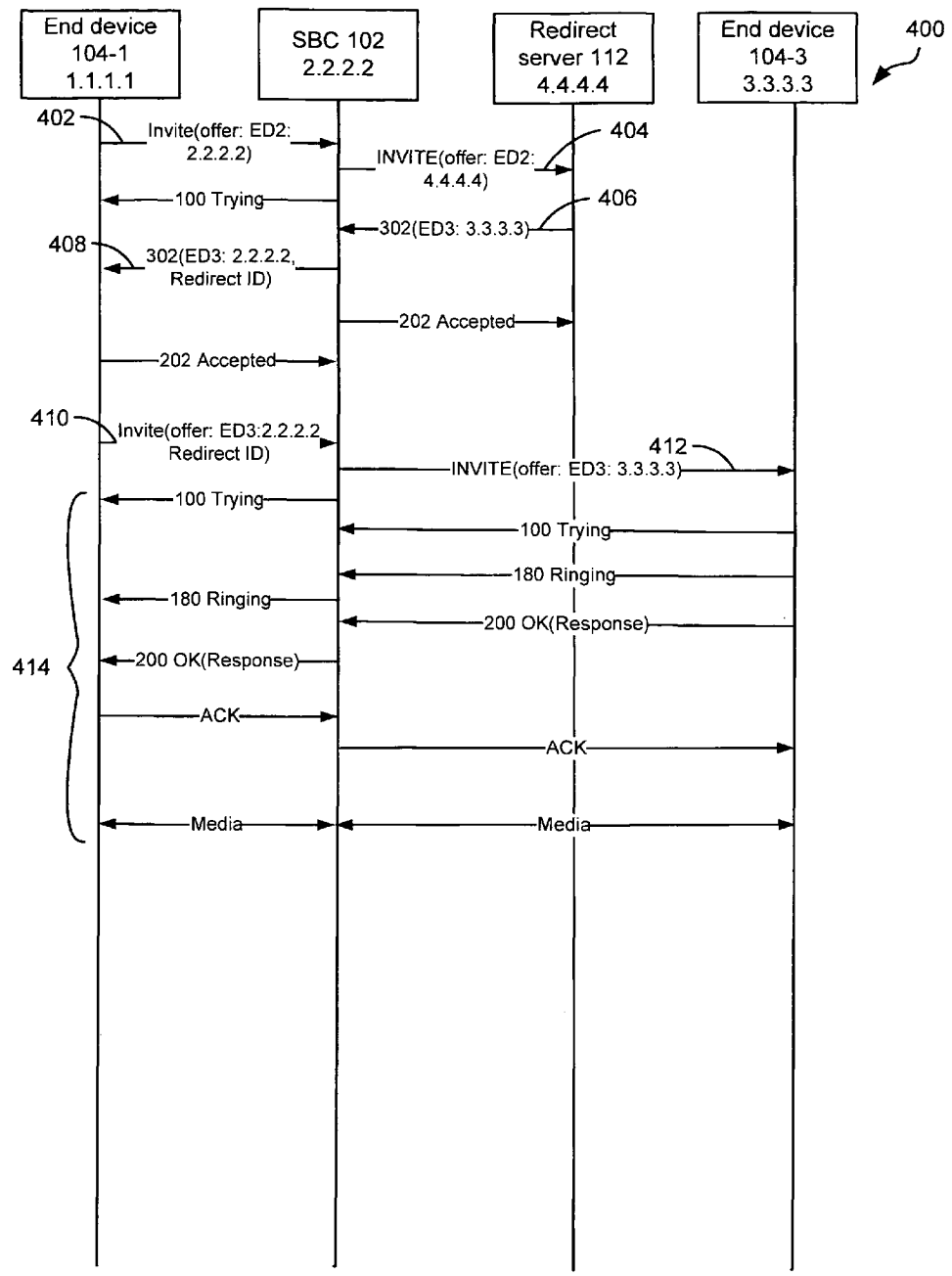
FIG. 4 illustrates an example method for redirecting calls.

FIG. 4 illustrates an example method for redirecting calls. As shown, end device 108-1 sends an invite (Offer: ED2, 2.2.2.2) to session border controller 102 in a message 402. It should be noted that in call flow 400, originating gateway 104 and terminating gateway 106 are omitted but may be participating in the call flow. Also, not all messages in call flow 400 will be described but a person skilled in the art will understand the call flow without further description.

In a message 404, session border controller 102 sends an INVITE(offer: ED2, 4.4.4.4) message to redirect server 112.

In a message 406, redirect server 112 determines that the call should be redirected to end device 108-3. Redirect server 112 sends a 302 (ED3: 3.3.3.3) message back. This message includes an identifier (ED3) for end device 108-3 and an address (3.3.3.3) at which to contact end device 108-3. This indicates a redirect to end device 108-3.

When a session border controller 102 receives the 302 message, a redirect ID and the address, 3.3.3.3, is cached for later use.

In a message 408, session border controller sends a 302 (ED3: 2.2.2.2, Redirect ID) message to end device 108-1. This message includes the redirect ID for end device 108-3 and also includes the address for session border controller 102.

In a message 410, end device 108-1 sends an invite (Offer: ED3: 2.2.2.2, Redirect ID) message to session border controller 102. This invite message is sent to an address of session border controller 102, 2.2.2.2, and includes the redirect ID for end device 108-3. Session border controller 102 then uses the redirect ID to determine the address for end device for 108-3.

In a message 412, session border controller 102 then sends an invite (Offer: ED3, 3.3.3.3) to end device 108-3. This initiates a call to end device 108-3. In further messages 414, session border controller 102 facilitates messaging between itself and end device 108-1 and itself and end device 108-3 to set up a call between end device 108-1 and end device 108-3.

Figure 5:
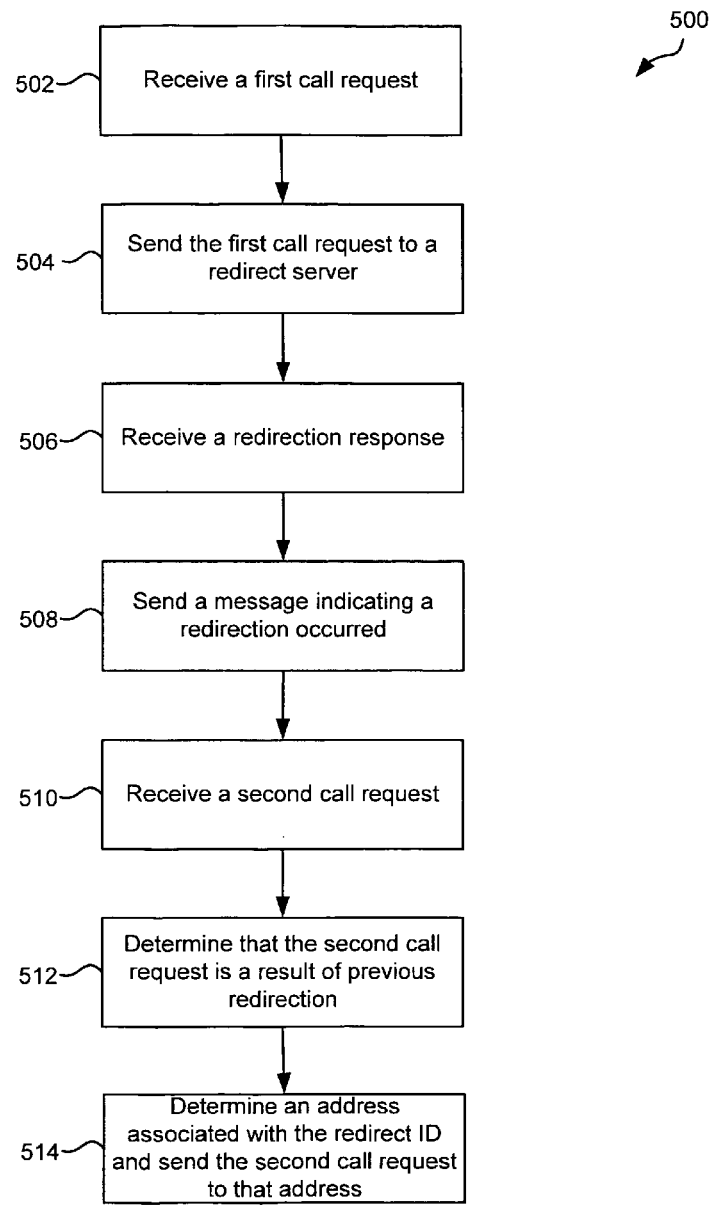
FIG. 5 illustrates another example method for redirecting calls.

FIG. 5 illustrates another example method for redirecting calls. In step 502, a first call request is received from the end device 108-1 for end device 108-2.

In step 504, the first call request is sent to redirect server 112. In step 506, a redirection response is received. The redirection may indicate a redirection to end device 108-3 and also includes an address for end device 108-3.

In step 508, a message is sent to end device 108-1 indicating a redirection occurred. The message includes the address of SBC 102 as the respond-to address and does not include the address for end device 108-3. Also, the message may include a redirect ID for the redirection.

In step 510, a second call request is received from end device 108-1. It is addressed to SBC 102 and includes the redirect ID.

In step 512, SBC 102 determines that the second call request is a result of the previous redirection. For example, the redirect ID may have been stored. The redirect ID is looked up and if it is found in storage, then, in step 514, an address associated with the redirect ID is determined and the second call request is sent to the address for end device 108-3 without going through redirect server 112.

Accordingly, particular embodiments preserve session border controller functionalities and interwork redirect messages to achieve successful call establishments. The functionality of address hiding is preserved even when a session border controller needs to redirect requests. Also, particular embodiments allow redirects to be facilitated between end devices 108 without the problems of a call loop or any security issues.

Although the description has been described with respect to particular embodiments thereof, these particular embodiments are merely illustrative, and not restrictive of the invention. Although SIP is described, other protocols may be appreciated.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic may be stored in an information storage medium, such as a computer-readable medium, as a plurality of instructions adapted to direct an information processing device to perform a set of steps disclosed in particular embodiments. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments of the invention will be employed without a corresponding use of other features without departing from the scope and spirit of the invention as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   receiving, from a first device at a network device, a first call request directed to a second device;
   sending the first call request from the network device to a redirect server;

receiving a redirection response at the network device from the redirect server indicating a redirection of a destination of the first call request from the second device to a third device, the redirection response comprising a third device address for the third device;

based on receiving the redirection response from the redirect server, generating, using the network device, a redirection information for the first call, the redirection information being associated with the third device address and including a redirection identifier;

storing, using the network device, the redirection information;

sending a message from the network device to the first device, the message indicating a redirection of the first call request to the third device and comprising a respond-to address for the network device, the message also including the redirection identifier;

receiving a second call request from the first device at the network device, the second call request being addressed to the respond-to address for the network device and including the redirection identifier;

identifying, using the network device, the stored redirection information based on the redirection identifier included in the second call request;

determining, using the network device and based on the identified redirection information, that the second call request is a redirection based on the first call request; and based on the determining, sending, using the network device, the second call request to the third device using the third device address that is obtained using the redirection information.

2. The method of claim 1, further comprising deleting the stored redirection information after receiving the second call request such that subsequent call requests directed to the second device are not sent to the third device without being sent to the redirect server.

3. The method of claim 1, further comprising determining the redirection information based on the first call request.

4. The method of claim 1, wherein the redirection information is associated with the first call request such that a call request directed to the second device that is different from the first call request cannot use the redirected information associated with the first call request.

5. The method of claim 1, wherein the redirection response is a SIP 302 message.

6. The method of claim 1, wherein the third device address for the third device is not included in the message sent to the first device.

7. The method of claim 1, wherein the network device is configured to send the second call request to the redirection server provided the second call request is not for the redirection based on the first call request.

8. An apparatus comprising:
one or more processors; and
logic encoded in one or more non-transitory tangible media for execution by the one or more processors and when executed operable to:
receive, from a first device at a network device, a first call request directed to a second device;
send the first call request from the network device to a redirect server;
receive a redirection response at the network device from the redirect server indicating a redirection of a destination of the first call request from the second device to a third device, the redirection response comprising a third device address for the third device;
based on receiving the redirection response from the redirect server, generate, using the network device, a redirection information for the first call, the redirection information being associated with the third device address and including a redirection identifier;
store, using the network device, the redirection information;
send a message from the network device to the first device, the message indicating a redirection of the first call request to the third device and comprising a respond-to address for the network device, the message also including the redirection identifier;
receive a second call request from the first device at the network device, the second call request being addressed to the respond-to address for the network device and including the redirection identifier;
identify, using the network device, the stored redirection information based on the redirection identifier included in the second call request;
determine, using the network device and based on the identified redirection information, that the second call request is a redirection based on the first call request; and
based on determining that the second call request is a redirection based on the first call request, send, using the network device, the second call request to the third device using the third device address that is obtained using the redirection information.

9. The apparatus of claim 8, wherein the logic when executed is further operable to delete the stored redirection information after receiving the second call request such that subsequent call requests directed to the second device are not sent to the third device without being sent to the redirect server.

10. The apparatus of claim 8, wherein the logic when executed is further operable to determine the redirection information at run-time.

11. The apparatus of claim 8, wherein the redirection information is associated with the first call request such that a call request directed to the second device that is different from the first call request cannot use the redirection information associated with the first call request.

12. The apparatus of claim 8, wherein the redirection response is a SIP 302 message.

13. The apparatus of claim 8, wherein the third device address for the third device is not included in the message sent to the first device.

14. The apparatus of claim 8, wherein the network device is configured to send the second call request to the redirection server provided the second call request is not for the redirection based on the first call request.

15. An apparatus comprising:
means for receiving, from a first device at a network device, a first call request directed to a second device; and
instructions encoded in a non-transitory machine-readable medium for execution by a processor, the instructions when executed by the processor cause the processor to perform operations including:
sending the first call request from the network device to a redirect server;
receiving a redirection response at the network device from the redirect server indicating a redirection of a destination of the first call request from the second device to a third device, the redirection response comprising a third device address for the third device;
based on receiving the redirection response from the redirect server, generating, using the network device, a redirection information for the first call, the redirection information being associated with the third device address and including a redirection identifier;

storing, using the network device, the redirection information;

sending a message from the network device to the first device, the message indicating a redirection of the first call request to the third device and comprising a respond-to address for the network device, the message also including the redirection identifier;

receiving a second call request from the first device at the network device, the second call request being addressed to the respond-to address for the network device and including the redirection identifier;

identifying, using the network device, the stored redirection information based on the redirection identifier included in the second call request;

determining, using the network device and based on the identified redirection information, that the second call request is a redirection based on the first call request; and based on the determining, sending, using the network device, the second call request to the third device using the third device address that is obtained using the redirection information.

16. The method of claim 1, further comprising storing address information for the second and third devices in the network device.

17. The method of claim 1, further comprising storing, in the network device, address information for at least the third device at least between a first time of receiving a redirection response at the network device transmitted from the redirect server and either of (1) a second time of sending the second call request directly from the network device to the third device or (2) an expiration of a timeout condition.

18. The method of claim 17, further comprising:
storing, in the network device, the address information for at least the third device upon an occurrence of receiving the redirection response; and including the redirection identifier in the message to the first device, wherein the redirection identifier is different from the third device address.

* * * * *

UNITED STATES PATENT AND TRADEMARK OFFICE
CERTIFICATE OF CORRECTION

PATENT NO. : 8,571,198 B2
APPLICATION NO. : 11/545744
DATED : October 29, 2013
INVENTOR(S) : Kumarasamy et al.

Page 1 of 1

It is certified that error appears in the above-identified patent and that said Letters Patent is hereby corrected as shown below:

In Column 8, Line 29, please amend as follows:
that follow, "a", "an", and "the" includes plural references unless

Signed and Sealed this
Third Day of April, 2018

Andrei Iancu
*Director of the United States Patent and Trademark Office*